US009405842B2

(12) United States Patent
Ishii (10) Patent No.: US 9,405,842 B2
(45) Date of Patent: Aug. 2, 2016

(54) EXECUTION SCREEN PUBLICATION DEVICE, EXECUTION SCREEN PUBLICATION METHOD, CLIENT DEVICE, AND CLOUD COMPUTING SYSTEM (75) Inventor: Makoto Ishii, Tokyo (JP)

(73) Assignees: SONY CORPORATION, Tokyo (JP); SONY INTERACTIVE ENTERTAINMENT INC., Tokyo (JP)

(*) Notice: Subject to any disclaimer, the term of this patent is extended or adjusted under 35 U.S.C. 154(b) by 151 days.

(21) Appl. No.: 13/609,496

(22) Filed: Sep. 11, 2012

(65) Prior Publication Data

US 2013/0111350 A1 May 2, 2013

(30) Foreign Application Priority Data

Oct. 31, 2011 (JP) .................................. 2011-239335

(51) Int. Cl.
G06F 15/16 (2006.01)
G06F 3/01 (2006.01)
G06F 17/30 (2006.01)
G06Q 30/02 (2012.01)

(52) U.S. Cl.
CPC ...... *G06F 17/30873* (2013.01); *G06Q 30/0201* (2013.01)

(58) Field of Classification Search
CPC .................... G06F 17/30828; G06F 17/30873; G06Q 30/0201
USPC ......................................................... 715/739
See application file for complete search history.

(56) References Cited

U.S. PATENT DOCUMENTS

| 7,594,255 B2* | 9/2009 | Yamamoto et al. ............ 725/153 |
| 2005/0098628 A1* | 5/2005 | Hashimoto et al. ........... 235/383 |
| 2009/0023496 A1* | 1/2009 | Kataoka ......................... 463/31 |
| 2009/0083637 A1* | 3/2009 | Skakkebaek et al. ......... 715/751 |

(Continued)

FOREIGN PATENT DOCUMENTS

| JP | 2000-24313 | 1/2000 |
| JP | 2000-167251 | 6/2000 |

(Continued)

OTHER PUBLICATIONS

Decision of Refusal dated Nov. 5, 2013, from corresponding Japanese Application No. 2011-239335.

(Continued)

*Primary Examiner* — Jennifer To
*Assistant Examiner* — John Repsher, III
(74) *Attorney, Agent, or Firm* — Katten Muchin Rosenman LLP (57) ABSTRACT

A content selection unit refers to a content information database, which stores content provided to a plurality of client devices and information related to provision of the content, linking the content with the information to one another, and selects, based on the information acquired by referring to the content information database, a predetermined number of content items from the content currently provided to at least one of the plurality of client devices. A user selection unit refers to the content information database and selects, for each content item selected by the content selection unit, a user who is executing the selected content. A publication unit publicizes moving images showing a screen in which the content currently executed by the user selected by the user selection unit is being executed such that the screen is viewable on a network, cyclically switching from one content item to another.

11 Claims, 6 Drawing Sheets

(56) References Cited

U.S. PATENT DOCUMENTS

| | | | |
|---|---|---|---|
| 2009/0249244 A1* | 10/2009 | Robinson et al. | 715/781 |
| 2010/0036967 A1* | 2/2010 | Caine et al. | 709/236 |
| 2010/0042932 A1* | 2/2010 | Lehtiniemi et al. | 715/747 |
| 2010/0094799 A1* | 4/2010 | Ohashi et al. | 706/54 |
| 2010/0166062 A1* | 7/2010 | Perlman et al. | 375/240.05 |
| 2010/0235762 A1* | 9/2010 | Laiho et al. | 715/753 |
| 2010/0241968 A1* | 9/2010 | Tarara et al. | 715/751 |
| 2010/0251094 A1* | 9/2010 | Holm et al. | 715/230 |
| 2010/0330954 A1* | 12/2010 | Manning Cassett et al. | 455/405 |
| 2011/0047487 A1* | 2/2011 | DeWeese et al. | 715/758 |
| 2011/0060666 A1* | 3/2011 | Gromek | G06F 3/0482 705/27.2 |
| 2011/0078573 A1* | 3/2011 | Ooba | 715/733 |
| 2011/0197132 A1* | 8/2011 | Escoda et al. | 715/733 |
| 2011/0202874 A1* | 8/2011 | Ramer et al. | 715/810 |
| 2012/0011451 A1* | 1/2012 | Bansal et al. | 715/753 |
| 2012/0096368 A1* | 4/2012 | McDowell | 715/748 |

FOREIGN PATENT DOCUMENTS

| | | |
|---|---|---|
| JP | 2002-248273 | 9/2002 |
| JP | 2007-7194 | 1/2007 |
| JP | 2008-276748 | 11/2008 |
| JP | 2009-119146 | 6/2009 |
| JP | 2010-92304 | 4/2010 |
| JP | 2011-86293 | 4/2011 |

OTHER PUBLICATIONS

Notification of Reason(s) for Refusal dated Jul. 2, 2013, from corresponding Japanese Application No. 2011-239335.

* cited by examiner

| CONTENT ID | USER INFORMATION | PROVISION INFORMATION | CURRENT STATUS |
|---|---|---|---|
| CID0001 | USER 0001 | 33 TIMES | CURRENTLY PROVIDED |
| | | 514 MINUTES | |
| | USER 0002 | 5 TIMES | LOG-OFF |
| | | 83 MINUTES | |
| | ⋮ | ⋮ | ⋮ |
| | USER XXXX | 17 TIMES | CURRENTLY PROVIDED |
| | | 132 MINUTES | |
| ⋮ | ⋮ | ⋮ | ⋮ |
| CIDZZZZ | USER 0001 | 12 TIMES | CID0001 |
| | | 208 MINUTES | |
| | ⋮ | ⋮ | ⋮ |
| | USER YYYY | 47 TIMES | CURRENTLY PROVIDED |
| | | 710 MINUTES | |

EXECUTION SCREEN PUBLICATION DEVICE, EXECUTION SCREEN PUBLICATION METHOD, CLIENT DEVICE, AND CLOUD COMPUTING SYSTEM

BACKGROUND OF THE INVENTION

1. Field of the Invention

The present invention relates to an execution screen publication device, an execution screen publication method, a client device, and a cloud computing system.

2. Description of the Related Art

Recent rapid advances in communication technologies such as that of the Internet have allowed users to be provided with various content via a network, i.e., to benefit from so-called cloud services. With the user of cloud services, users need not be in possession of an application program to run content in order to use that content.

Also, recent progress in computer technologies has been remarkable. In the past, content such as game applications that require intensive computation cost demanded dedicated hardware for execution. Recently, however, execution of a game application on software simulating the hardware, namely, so-called an emulator, has become a workable choice.

We have become aware of the possibility of promoting communication between a large number of users by publicizing a screen in which content is currently executed by a given user by using computing resources of a cloud computing system in such a manner that a plurality of other users can view or that users can communicate with each other.

SUMMARY OF THE INVENTION

The present invention addresses the aforementioned goal and a purpose thereof is to provide a technology capable off promoting communication between users via the content provided by a cloud computing system.

One embodiment of the present invention that addresses the above goal relates to an execution screen publication device. The device comprises: a content selection unit configured to refer to a content information database, which stores content provided to a plurality of client devices and information related to provision of the content, linking the content together with the information, and to select, based on the information acquired by referring to the content information database, a predetermined number of items of content from the content currently provided to at least one of the plurality of client devices; a user selection unit configured to refer to the content information database and select, for each item of content selected by the content selection unit, a user who is executing the selected item of content; and a publication unit configured to publicize moving images showing an execution screen in which the item of content currently executed by the user selected by the user selection unit is being executed such that the execution screen is viewable on a network, cyclically switching between the predetermined number of items of content.

Another embodiment of the present invention relates to a cloud computing system provided with a plurality of client devices and a plurality of computing resources adapted to provide content to the plurality of client devices. Each of the plurality of client devices comprises: a content information storage unit configured to store at least the content provided from the cloud computing system in the past, the frequency that the content was provided to the user, and the duration in which the content is provided, linking the content, frequency (the number of times), and duration with each other. The cloud computing system comprises: an information acquisition unit configured to acquire information identifying a user using each of the plurality of client devices, information stored in the content information storage unit of each of the plurality of client devices, and information identifying the content provided to the user of each of the plurality of client devices; a content information database configured to refer to the information acquired by the information acquisition unit, and to store, for each item of content provided by the cloud computing system, at least content user information identifying the user provided with the content in the past, the frequency that the content is provided to the user, the duration in which the user is provided with the content, and execution information indicating whether the user is executing the content, linking the content user information, frequency, duration, and execution information together with the content; a content selection unit configured to select, based on the information acquired by referring to the content information database, a predetermined number of items of content from the content currently provided by the cloud computing system; a user selection unit configured to refer to the content information database and select, for each content selected by the content selection unit, a user who is executing the selected item of content, and a publication unit configured to publicize, over a network, moving images showing a screen in which the item of content currently executed by the user selected by the user selection unit is being executed, cyclically switching between the predetermined number of items of content.

Still another embodiment of the present invention relates to an execution screen publication method executed by computing resources of a cloud computing system adapted to provide content to a plurality of client devices via a network. The execution screen publication method comprises: referring to a content information database, which stores the content provided to the plurality of client devices and information related to provision of the content, linking the content together with the information, and selecting, based on the information acquired by referring to the content information database, a predetermined number of items of content from the content currently provided by the cloud computing system; referring to the content information database and selecting, for each item of content, a user who is executing the selected content; and publicizing, over a network, moving images showing a screen in which the item of content currently executed by the selected user is being executed, cyclically switching between the predetermined number of items of content.

Yet another embodiment of the present invention relates to a client device in a content provision system provided with a plurality of client devices and a server providing content to the plurality of client devices via a network. The client device comprises: an information storage unit configured to store content user information identifying a user using the client device, the content user provided from the server in the past, the frequency that the content is provided, the duration in which the content is provided, and information identifying the content provided to the content device. The server comprises: an information acquisition unit configured to acquire the information stored in the information storage unit of each of the plurality of client devices, from each of the plurality of client devices including the host client device, a content information database configured to refer to the information acquired by the information acquisition unit, and to store, for each item of the content provided by the server, at least information identifying the user provided with the content in the past, a frequency that the content is provided to the user, a duration in which the user is provided with the content, and information indicating whether the user is executing the content, linking the information, frequency, and duration together with the content; a content selection unit configured to select, based on the information acquired by referring to the content information database, a predetermined number of items of content from the content currently provided by the server; a user selection unit configured to refer to the content information database and select, for each item of content selected by the content selection unit, a user who is executing the selected item of content; and a publication unit configured to publicize, over a network, moving images showing a screen in which the item of content currently executed by the user selected by the user selection unit is being executed, cyclically switching between the predetermined number of items of content.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A summary of the embodiment will be described. The cloud computing system according to the embodiment is configured to publicize, on a network, execution screens in which content is being executed by a predetermined number of users by using the computing resources of the cloud computing system, cyclically switching from one content item to another. As a result, the execution screens as publicized will themselves be new content and promote communication by users viewing the screens.

Figure 1:
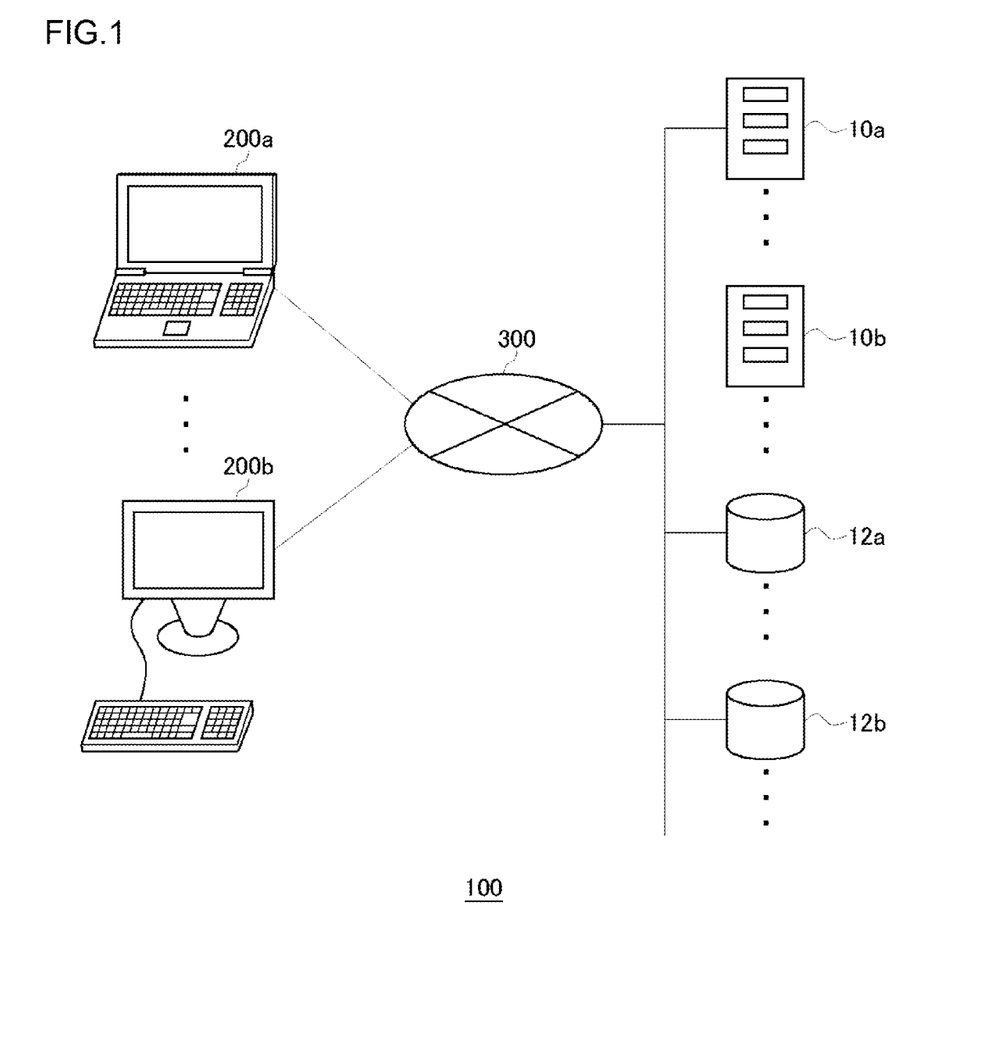
FIG. 1 shows a summary of a cloud computing system.

FIG. 1 shows a summary of a cloud computing system 100. FIG. 1 shows client devices 200*a* and 200*b* selected from a plurality of client devices which are generically referred to as client devices 200. The client devices 200 are connected to a plurality of servers 10 and databases 12 via a network such as the Internet. Of a plurality of servers 10, FIG. 1 shows servers 10*a* and 10*b*. Of a plurality of databases 12, FIG. 1 shows databases 12*a* and 12*b*.

FIG. 1 shows the client devices 200, the servers 10, etc., are connected via the network 300 and so is a schematic illustration of an actual system configuration. However, the user of the client device 200 is not usually aware of the system configuration including the server 10, the database 12, etc. as well as the network 300. Users using the cloud computing system 100 need not understand the physical configuration or software configuration of the cloud computing system 100 to benefit from the service. The users feel as if he or she is using the service out of the cloud of network.

In many cases, the client device 200 is provided with computing resources such as a central processing unit (CPU) and is capable of executing at least a part of an application in the local environment of the client device 200. However, whether the application is executed by using the local computing resources or the computing resources of the cloud computing system 100 on a network is not an important issue for the user using the client device 200. The user can equally benefit from the service. Therefore, the term "computing resources of a cloud computing system" or, simply, "computing resources" as used in this specification means at least one of the computing resources of the client device 200 and the computing resources of the server 10, etc. in the cloud computing system 100.

Figure 2:
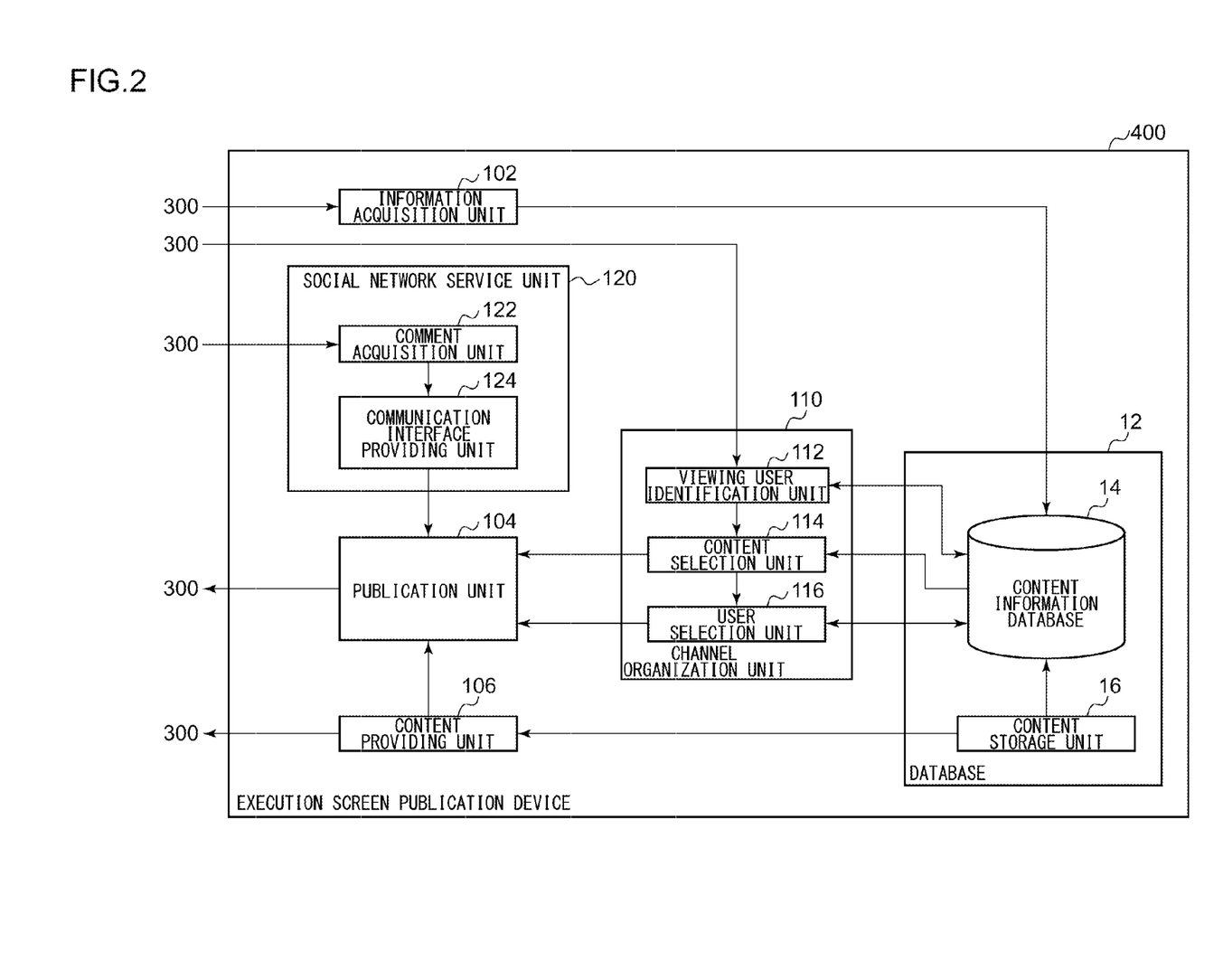
FIG. 2 schematically shows the functions of an execution screen publication device according to the embodiment.

FIG. 2 schematically shows the functions of an execution screen publication device 400 according to the embodiment. The execution screen publication device 400 shown in FIG. 2 is implemented in particular by the server 10 and the database 12 of the cloud computing system 100 shown in FIG. 1.

The execution screen publication device 400 includes a database 12, an information acquisition unit 102, a publication unit 104, a content providing unit 106, a channel organization unit 110, and a social network service unit 120. The database 12 further includes a content information database 14 and a content storage unit 16. The channel organization unit 110 further includes a viewing user identification unit 112, a content selection unit 114, and a user selection unit 116. The social network service unit 120 further includes a comment acquisition unit 122 and a communication interface providing unit 124.

The content storage unit 16 stores content that the cloud computing system 100 provides to the client device 200 via the network 300. The content providing unit 106 acquires content to be provided to the user from the content storage unit 16 and causes the acquired content to be executed by the computing resources. For this reason, the phrase "provide the content" as used in this specification means at least one of the two cases. In the first case, the computing resources of a server etc. located on the network executes a program and a screen showing the result of execution is presented to the client device 200 via the network 300. In the second case, content is provided to the client device 200 via the network 300 and the computing resources of the client device 200 execute the content.

The content information database 14 stores the content provided by the content providing unit 106 to at least one client device 200 in the past and information related to the provision of the content, linking the content with the information to one another. The term "information related to the provision of the content" means information that reflects the popularity of the content, or information reflecting the content-related skill level of the user provided with the content. Information identifying the user currently provided with the content is also included in the information related to the provision of the content.

For example, the "information reflecting the popularity of the content" represents the frequency that the content is provided to at least one user or the total period of time in which the content is provided. Since content that are popular to users are executed by many users, the frequency of provision and period of time of provision are considered to be more than those of the content that are not so popular. Therefore, the frequency and period of time of provision of content will be information reflecting the popularity of the content.

The term "information reflecting the content-related skill level of the user provided with the content" means the frequency and period of time of provision to each user provided with the content in the past. Users frequently provided with a particular content item or executing the content for a long period of time are likely to be experienced with the content. Therefore, the frequency and period of time that a particular user is provided with a particular content item will be information reflecting the skill level of the user related to the content.

Figure 3:
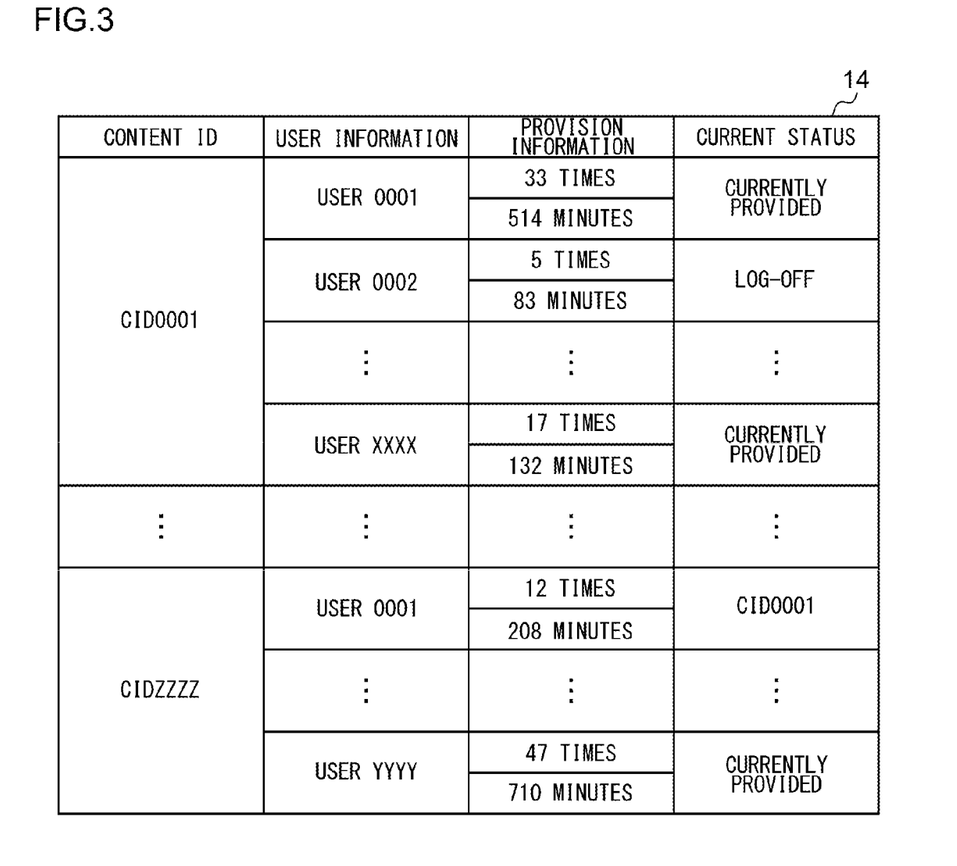
FIG. 3 schematically shows an exemplary data structure of the content information database according to the embodiment.

FIG. 3 schematically shows an exemplary data structure of the content information database 14 according to the embodiment. A content ID (IDentification) for uniquely identifying content is assigned to each content item stored in the content storage unit 16 and provided by the content providing unit 106. For each content ID, the content information database 14 stores user information identifying the user provided with the content in the past. The term "user information" means a user ID uniquely assigned to each user.

For each user provided with content in the past, the content information database 14 stores provision information indicating the frequency and period of time that the content is provided to the user. The content information database 14 further stores the current status of the user provided with the content in the past. The term "current status of the user" means information indicating whether or not the user is currently logging in the cloud computing system 100, and, if the user is logging in, which content is being provided to the user.

The description with reference to FIG. 2 will be continued. The content selection unit 114 refers to the content information database 14 and, based on the acquired information, selects a predetermined number of content items from the content currently provided to at least one of the plurality of client devices 200. More specifically, the content selection unit 114 refers to the content information database 14, extracts content currently provided to at least one user, and selects from the extracted content a predetermined number of content items based on the total frequency that the content is provided to users.

The user selection unit 116 refers to the content information database 14 and selects, for each content item selected by the content selection unit 114, one user who is executing the selected content. More specifically, the user selection unit 116 selects one particular user who is executing the content based on the period of time in which the content is executed, for each of the predetermined number of content items selected by the content selection unit 114.

The publication unit 104 acquires moving images showing the execution screen of the content executed by each user selected by the user selection unit 116. The publication unit 104 publicizes the execution screens so as to be viewable on the network 300, cyclically switching from one content item to another. In this way, anyone can view, on a real time basis, a digest of execution screens of the content currently provided by the cloud computing system 100 according to the embodiment, using any device capable of accessing the network 300.

As described above, the total frequency of provision to users is considered to reflect the popularity of the content. Therefore, the content selection unit 114 can select the content highly popular to users by selecting the content provided to users many times. The user selection unit 116 can select the user experienced in the content by selecting the user provided with the content for a long period of time.

For example, if a content item is the game content highly popular to users, moving images showing an experienced user playing the game can themselves be enjoyed as novel content. By collecting a certain number of sets of such moving images showing the play and by publicizing the collected images, cyclically switching moving images, users using the cloud computing system 100 may be provided with an opportunity of meeting content of interest to the user by viewing moving images of the play. The advantage from this is substantially equivalent to "zapping", in which a user watches the television by switching channels frequently. In this sense, the channel organization unit 110 functions as a "zapping channel organization unit" of the cloud computing system 100. Hereinafter, moving images of the play publicized by the publication unit 104 may be referred to as a "zapping channel".

The "certain number" in which the content selection unit 114 selects content is the number of content items forming a zapping channel and may be determined experimentally, allowing for the duration of one period of the zapping channel. Assuming that the user refers to a zapping channel for selection of content, it is desirable that the duration of one period is about several minutes. Thus, given that the duration of broadcast of a single content item is approximately 30 seconds, the number of content items selected by the content selection unit 114 will be about 10. While the current zapping channel is being publicized, the content selection unit 114 selects content that forms the next zapping channel from the content currently executed by users. This allows a digest of execution screens of the content currently provided by the cloud computing system 100 on a real time basis.

As mentioned above, moving images showing the play of an experienced user can themselves be novel content. Accordingly, the comment acquisition unit 122 acquires comments created by users who are viewing the zapping channel publicized by the publication unit 104. The communication interface providing unit 124 causes the publication unit 104 to publicize the user comments acquired by the comment acquisition unit 122 along with the moving images publicized by the publication unit 104.

Figure 4:
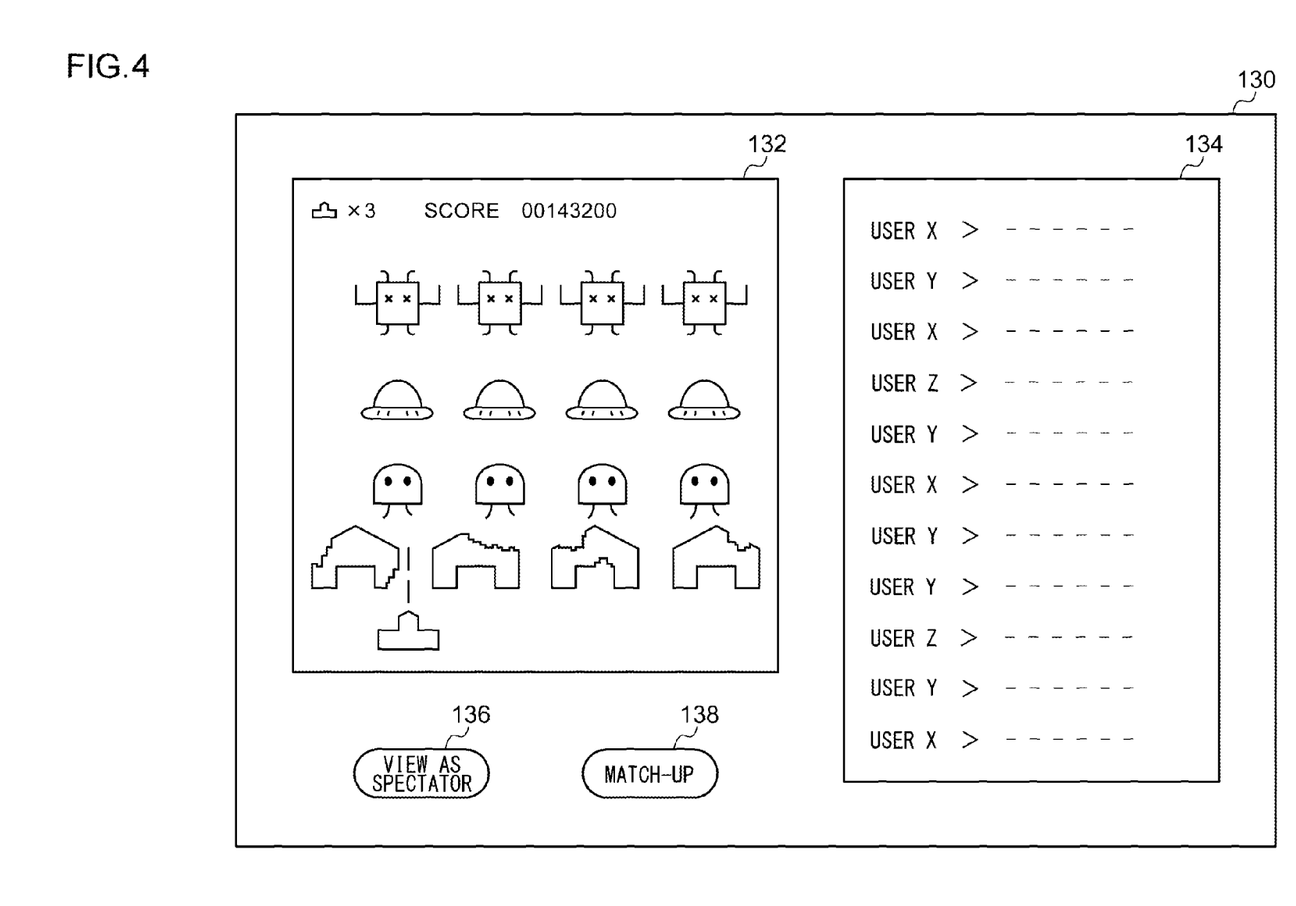
FIG. 4 shows an example of a publication screen publicized by the publication unit according to the embodiment.

FIG. 4 shows an example of a publication screen 130 publicized by the publication unit 104 according to the embodiment. If the content provided by the cloud computing system 100 is the game content developed in the past, the number of content items will be enormous. If the user is expected to select from the enormous number of content items (e.g., simply select from a list of information such as game types, game names, etc.), the chance that the user encounters content that the user can intuitively take an interest would not be so high. Accordingly, the publication unit 104 displays a zapping channel 132 in the publication screen 130. By viewing the zapping channel, the user can view a digest of images showing other users currently playing on a real time basis. The user can be given a chance of discovering a new content item suited to the user's preference from among the enormous number of content items.

As shown in FIG. 4, the publication screen 130 is provided with a communication interface 134 provided by the communication interface providing unit 124 and displaying comments from other users viewing the zapping channel 132. This promotes communication between users viewing the zapping channel. The publication screen 130 is also provided with a spectator's icon 136, which is an interface used when the user viewing the zapping channel takes an interest in a particular content item and used in order to view play images carefully.

When the user presses the spectator's icon 136 using a user interface such as a mouse, images currently displayed continue to be displayed subsequently.

The publication screen 130 is also provided with a match-up icon 138 for transmitting a request for match-up, which is an indication to play against the user executing the content represented by play images viewed by the requesting user. When the user viewing the play images presses the match-up icon 138, a window (not shown) is displayed to indicate the request to the other user executing the content represented by play images. When the other user accepts the request for a match-up, a match-up between the requesting user and the requested user is set up. Thereby, a match-up between them in the content is initiated via the network 300.

The description with reference to FIG. 2 will be continued. The viewing user identification unit 112 identifies a user viewing the zapping channel publicized by the publication unit 104. Using the information on the user identified by the viewing user identification unit 112, the content selection unit 114 may refer to the content information database 14 so as to extract the content provided to the viewing user and determine the content that should be selected based on the extracted content information. For example, the content provided to the user in the past may be selected. Alternatively, other content of the same genre as the content provided to the user in the past may be selected. This allows the content suited to the user's preference of the user viewing the zapping channel to be built in the zapping channel provided to the user.

Figure 5:
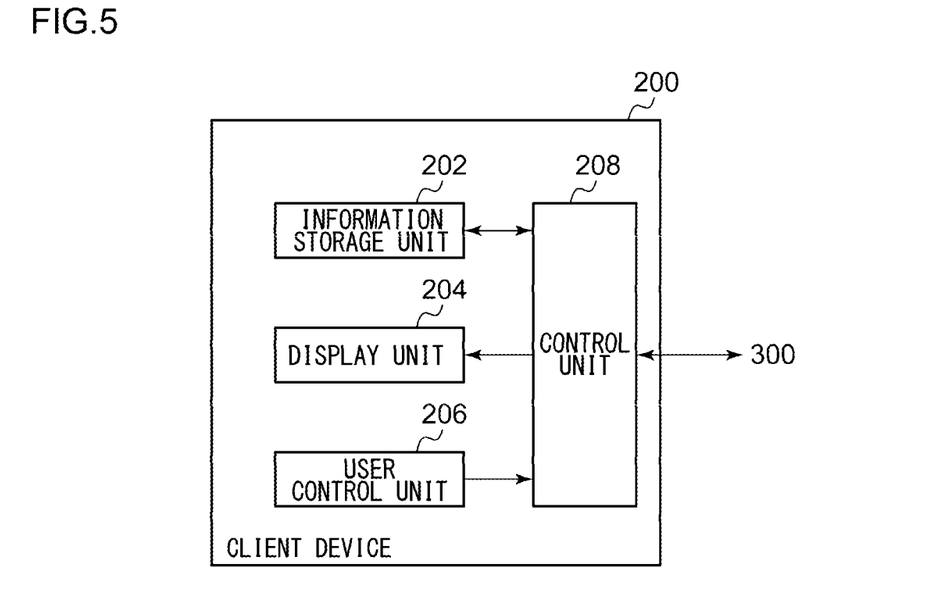
FIG. 5 schematically shows the functional configuration of the client device according to the embodiment.

It should be noted that the information stored in the content information database 14 is updated by the information acquired by the information acquisition unit 102 from the client device 200 via the network 300. FIG. 5 schematically shows the functional configuration of the client device 200 according to the embodiment. Each client device 200 comprises an information storage unit 202, a display unit 204, a user control unit 206, and a control unit 208 for controlling the components in a centralized manner.

The information storage unit 202 is implemented by a recording medium such as a hard disk drive (HDD) or a solid state drive (SSD) in the client device 200. The information storage unit 202 stores at least the content provided from the cloud computing system 100 in the past, the frequency that the content is provided, and the period of time in which the content is provided, linking them with each other. The information storage unit 202 also stores user information of the user using the client device 200.

When the client device 200 is provided with new content, the control unit 208 reflects the fact in the information storage unit 202 and notifies the information acquisition unit 102 accordingly via the network 300. Upon receiving an inquiry from the information acquisition unit 102, the control unit 208 communicates the information stored in the information storage unit 202 to the information acquisition unit 102. This makes it possible to update the content information database 14 to store the latest information. The control unit 208 is implemented by hardware including the CPU, memory, network interface, etc. of the client device 200 and software including the operating system of the client device 200.

For example, the display unit 204 is a liquid crystal display (LCD) monitor or an organic electroluminescence (OEL) monitor, etc., and displays a content execution screen and a zapping channel. The user control unit 206 is embodied by a keyboard, mouser, game controller, etc., and is a user interface for selecting content, controlling the content, and entering a comment.

Figure 6:
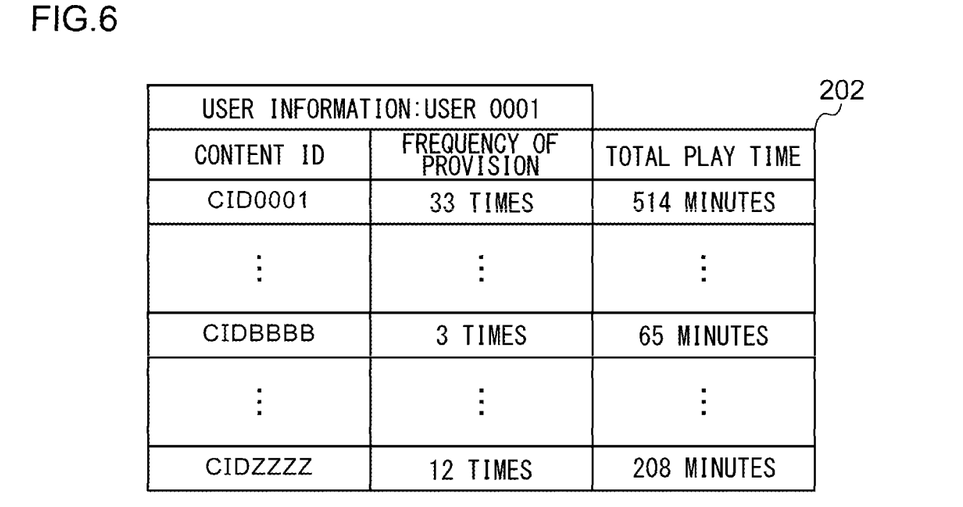
FIG. 6 schematically shows an exemplary data structure of the information storage unit according to the embodiment.

FIG. 6 schematically shows an exemplary data structure of the information storage unit 202 according to the embodiment. As shown in FIG. 6, a user ID of the user using the client device 200 is stored as user information in the information storage unit 202. The information storage unit 202 further stores the content ID of the content provided in the past, the frequency that the content is provided, and the total play time of the content.

Figure 7:
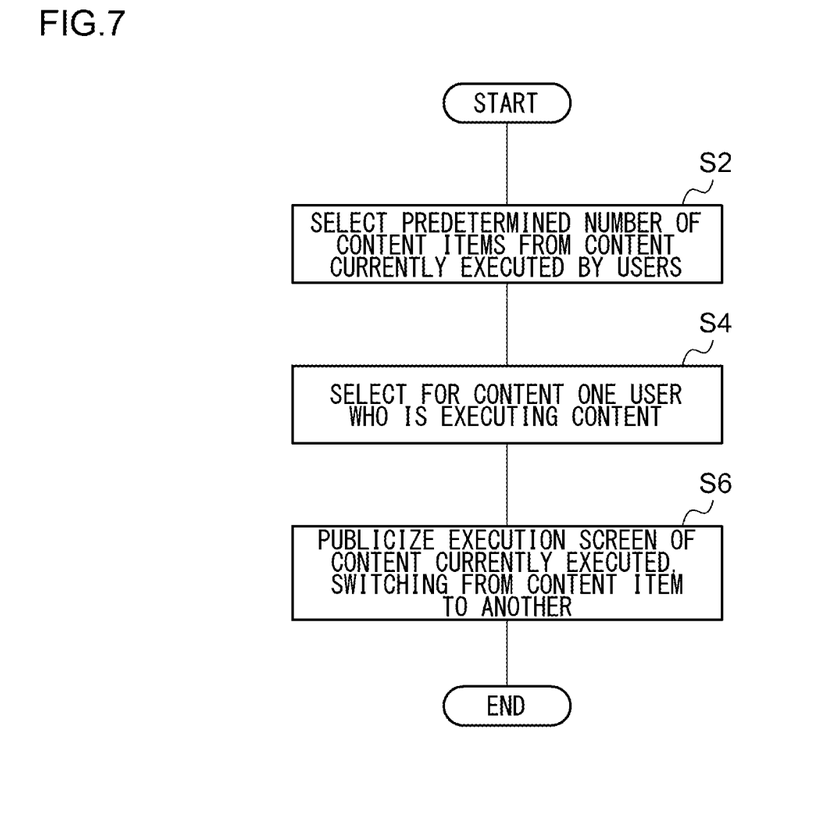
FIG. 7 is a flowchart showing the flow of an execution screen publication process according to the embodiment.

FIG. 7 is a flowchart showing the flow of an execution screen publication process according to the embodiment. The process in the flowchart is repeatedly executed while the execution screen publication device 400 is running.

The content selection unit 114 refers to the content information database 14 and selects a predetermined number of content items from the content currently executed by at least one user (S2). The user selection unit 116 refers to the content information database 14 and selects, for each content item selected by the content selection unit 114, one user who is executing the selected content (S4).

The publication unit 104 publicizes the execution screen of the content currently executed by the user selected by the user selection unit 116 on the network 300, switching from one content item to another (S6). By repeating the above steps, the channel organization unit 110 according to the embodiment can publicize the execution screen of the content executed by the user over the network 300 on a real time basis.

The operation according to the above configuration is as described below. When the user of the cloud computing system 100 according to the embodiment is provided with content from the content providing unit 106, information related to the provision of the content is stored in the information storage unit 202 in the client device 200 used by the user. The information stored in the information storage unit 202 is acquired by the information acquisition unit 102 via the network 300 and stored in the content information database 14.

The content selection unit 114 selects the content currently executed by the user. Of the users executing the selected content, the user selection unit 116 selects the user considered to be experienced in controlling the content. The publication unit 104 publicizes the execution screen of the content currently executed by the user selected by the user selection unit 116.

The image publicized by the publication unit 104 can be viewed by using a device capable of accessing the network 300. A user desiring to receive content from the cloud computing system 100 is given an opportunity to view the actual content execution screen by viewing the images publicized by the publication unit 104. This makes it possible for the user to encounter content that the user has never envisaged before.

The publication unit 104 also displays a communication interface 134 that displays a comment created by a viewer in addition to the images. Since the network 300 is open to public, an unspecified number of users can view the comment. A novel relationship can develop or new opponents for a match-up can be found from exchange of comments between viewers. Thus, the channel organization unit 110 according to the embodiment is capable of achieving growth of the community in which a large number of viewers participate. As compared with the related-art mode in which only acquaintances or those who are acquainted with them can join the content for a match-up or view the content as a spectator, decrease in liveliness of communication is reduced.

As described above, the channel organization unit 110 according to the embodiment establishes moving images showing the real time play of a user as new content, and allows a large number of users viewing the images to share their thoughts via the communication interface 134. The gives visual incentive to facilitate match making activities by users and inspires match making activities among users who exchange comments, thereby promoting expansion of a social network built around the content of interest to users. This can also improve the rate of successful match making through user comments.

As described above, according to the embodiment of the present invention, a technology is provided capable of promoting communication between users via the content provided by the cloud computing system 100.

Described above is an explanation based on an exemplary embodiment. The embodiment is intended to be illustrative only and it will be obvious to those skilled in the art that various modifications to constituting elements and processes could be developed and that such modifications are also within the scope of the present invention.

[Variation 1]

The information storage unit 202 according to the embodiment is described as storing the content ID of the content provided to the user in the past. In addition to this, the information storage unit 202 may store the content ID of the content that the user viewed in the past as a spectator. In this way, whenever the content that the user joined for a match-up or viewed as a spectator in the past is being played by another user, the user can view the content as a spectator or transmit a match-up request to the executing user.

[Variation 2]

The cloud computing system 100 according to the embodiment is described as configured such that, for organization of a zapping channel, the content selection unit 114 selects the content considered to be popular to users, and then the user selection unit 116 selects the user playing the selected content. Instead, the user selection unit 116 may select users currently playing content, and then the content selection unit may select content items to organize a zapping channel from those content items currently played by the selected user. This addresses the need of a given user who desires to view the content played by a particular user as a spectator, by organizing the execution screen of the content currently played by the particular user as a zapping channel. This allows providing a sort of "personal zapping channel" suited to the preference of the user. This can be achieved by storing the user ID of the user whose play the user desires to view as a spectator in the information storage unit 202 and communicating the user ID to the user selection unit 116 via the information acquisition unit 102.

[Variation 3]

The cloud computing system 100 according to the embodiment is described as being configured such that the user selection unit 116 selects a user experienced in the execution of the content selected by the content selection unit 114. Instead, the user selection unit 116 may select a user of a similar skill level as the users viewing the zapping channel as a spectator. This will allow the publication unit 104 to provide a "personal zapping channel" suited to the skill level of each user. This allows the user to know a user of a similar level as himself or herself and gain an opportunity for a match-up with the user.

[Variation 4]

The content selection unit 114 according to the embodiment is described as selecting content based on the "information reflecting the popularity of the content" stored in the content information database 14. Alternatively, the content selection unit 114 may select content considering the time zone in which the zapping channel is provided in place of or in addition to the "information reflecting the popularity of the content". For example, the age group of users who use the cloud computing system 100 in a time zone of 15:00-19:00 is considered to be different from the age group of users in a time zone of 24:00-06:00. In this respect, the content selection unit 114 selects content preferred by users of an age group dominant in each time zone. For example, this can be achieved by associating the content ID with the age information of users preferring the content and storing the ID and the information in the content information database 14. It can also be achieved by keeping track of the age group of users executing the content or users viewing the zapping channel, by including the user's age information in the user information, in addition to the user ID. This is advantageous in that a zapping channel suitable to the users using the cloud computing system 100 can be organized.

What is claimed is:

1. An execution screen publication device having a processor comprising:

a content selection unit configured to, using the processor, refer to a content information database, which stores content provided to a plurality of client devices and information related to provision of the content, linking the content together with the information, and to select, based on the information acquired by referring to the content information database, a predetermined number of items of content from the content currently provided to at least one of the plurality of client devices, wherein each of the predetermined number of items of content are selected based on a playing history of a user;

a user selection unit configured to refer to the content information database and select using the processor, for each item of content selected by the content selection unit, a single user who is executing the selected item of content, wherein the single user selected by the execution screen publication device who is executing the content has an experience level in controlling the content greater than a predetermined threshold; and a publication unit configured to publicize moving images to users currently not executing each item of content selected by the content selection unit showing an execution screen in which the item of content currently executed by the single user selected by the user selection unit is being executed such that the execution screen is viewable to the users currently not executing each item of content selected by the content selection unit on a network, cyclically switching between the predetermined number of items of content, wherein, for each of the plurality of client devices not currently executing the content, the cyclically switching is not stopped until a user selects an item of content to start execution of the selected item of content, wherein the user selection unit selects a particular user who has executed the item of content for a longest duration, for each of a second predetermined number of items of content selected by the content selection unit.

2. The execution screen publication device according to claim 1, wherein the content information database at least stores popularity information reflecting popularity of content and skill-level information reflecting a content-related skill level of the user provided with the content, linking the popularity information and the skill-level information together with the content.

3. The execution screen publication device according to claim 1, wherein the content information database at least stores content user information identifying the user provided with the content in the past, the frequency that the content was provided to the user, the duration in which the user is provided with the content, and execution information indicating whether the user is executing the content, linking the content user information, frequency, duration, and execution information together with the content.

4. The execution screen publication device according to claim 3,
wherein the content selection unit refers to the content information database, extracts the items of content currently being executed by at least one user, and selects from the extracted items of content the second predetermined number of items of content based on the respective total frequency that the items of content are provided to the user.

5. The execution screen publication device according to claim 1, further comprising:
a viewing user identification unit configured to identify a user viewing the execution screen publicized by the publication unit;
wherein, based on information on the user identified by the viewing user identification unit, the content selection unit refers to the content information database so as to extract the content provided to the viewing user and further extract the content that should be selected based on the extracted content.

6. The execution screen publication device according to claim 1, further comprising:
a comment acquisition unit configured to acquire a comment created by a user who is viewing the publication unit via a network; and
a communication interface providing unit configured to publicize the comment acquired by the comment acquisition unit along with the moving images.

7. A cloud computing system having a processor provided with a plurality of client devices having client processors, wherein the cloud computing system is adapted to provide content to the plurality of client devices,
wherein each of the plurality of client devices comprises:
a content information storage unit configured to store, using the client processor, at least the content provided from the cloud computing system in the past, the frequency that the content was provided to the user, and the duration in which the content is provided, linking the content, frequency, and duration with each other,
wherein the cloud computing system comprises:
an information acquisition unit configured to acquire, using the processor, information identifying a user using each of the plurality of client devices, information stored in the content information storage unit of each of the plurality of client devices, and information identifying the content provided to the user of each of the plurality of client devices;
a content information database configured to refer to the information acquired by the information acquisition unit, and to store, for each item of content provided by the cloud computing system, at least content user information identifying the user provided with the content in the past, the frequency that the content is provided to the user, the duration in which the user is provided with the content, and execution information indicating whether the user is executing the content, linking the content user information, frequency, duration, and execution information together with the content;
a content selection unit configured to select, based on the information acquired by referring to the content information database, a predetermined number of items of content from the content currently provided by the cloud computing system,
wherein each of the predetermined number of items of content are selected based on a playing history of a user;
a user selection unit configured to refer to the content information database and select, for each content selected by the content selection unit, a single user who is executing the selected item of content,
wherein the single user selected by the user selection unit who is executing the content has an experience level in controlling the content greater than a predetermined threshold; and
a publication unit configured to publicize to a plurality of client devices currently not executing the content selected by the content selection unit, over a network, moving images showing a screen in which the item of content currently executed by the single user selected by the user selection unit is being executed, cyclically switching between the predetermined number of items of content, wherein, for each of the plurality of client devices not currently executing the content, the cyclically switching is not stopped until a user selects an item of content to start execution of the selected item of content,
wherein the user selection unit selects a particular user who has executed the item of content for a longest duration, for each of a second predetermined number of items of content selected by the content selection unit.

8. An execution screen publication method executed by a cloud computing system having a processor, the cloud computing system adapted to provide content to a plurality of client devices via a network,
the execution screen publication method comprises:
referring to a content information database using the processor, wherein the content information database stores the content provided to the plurality of client devices and information related to provision of the content, linking the content together with the information, and
selecting, based on the information acquired by referring to the content information database, a predetermined number of items of content from the content currently provided by the cloud computing system,
wherein each of the predetermined number of items of content are selected based on a playing history of a user;
referring to the content information database and selecting, for each item of content, a single user who is executing the selected content,
wherein the single user that is selected who is executing the content has an experience level in controlling the content greater than a predetermined threshold; and
publicizing, over a network, to a plurality of client devices currently not executing the content selected from the content information database moving images showing a screen in which the item of content currently executed by the selected single user is being executed, cyclically switching between the predetermined number of items of content, wherein, for each of the plurality of client devices not currently executing the content, the cyclically switching is not stopped until a user selects an item of content to start execution of the selected item of content,
wherein a particular user who has executed the item of content for a longest duration is selected for each of a second predetermined number of items of content.

9. A computer program embedded in a non-transitory computer-readable recording medium, the program being designed to cause a cloud computing system having a processor, the cloud computing system providing content to a plurality of client devices via a network to implement a function for publicizing an execution screen in which the content is executed, wherein the function for publicizing comprises:

a module configured to refer to a content information database, which stores, using the processor, the content provided to the plurality of client devices and information related to provision of the content, linking the content together with the information, and to select, based on the acquired information, a predetermined number of items of content from the content currently provided by the cloud computing system;

a module configured to refer to the content information database and to select, for each item of content, a single user who is executing the selected content, wherein the single user that is selected who is executing the content has an experience level in controlling the content greater than a predetermined threshold; and a module configured to publicize, over a network, to a plurality of client devices currently not executing the content selected from the content information database moving images showing a screen in which the item of content currently executed by the selected single user is being executed, cyclically switching between the predetermined number of items of content, wherein, for each of the plurality of client devices not currently executing the content, the cyclically switching is not stopped until a user selects an item of content to start execution of the selected item of content, wherein the a module configured to refer to the content information database and to select selects a particular user who has executed the item of content for a longest duration, for each of a second predetermined number of items of content selected by the a module configured to refer to the content information database.

10. A client device having a processor in a content provision system provided with a plurality of client devices and a server providing content to the plurality of client devices via a network, wherein the client device comprises:

an information storage unit configured to store, using the processor, content user information identifying a user using the client device, the content user provided from the server in the past, the frequency that the content is provided, the duration in which the content is provided, and information identifying the content provided to the content device, wherein the server comprises:

an information acquisition unit configured to acquire the information stored in the information storage unit of each of the plurality of client devices, from each of the plurality of client devices including the host client device, a content information database configured to refer to the information acquired by the information acquisition unit, and to store, for each item of the content provided by the server, at least information identifying the user provided with the content in the past, a frequency that the content is provided to the user, a duration in which the user is provided with the content, and information indicating whether the user is executing the content, linking the information, frequency, and duration together with the content;

a content selection unit configured to select, based on the information acquired by referring to the content information database, a predetermined number of items of content from the content currently provided by the server, wherein each of the predetermined number of items of content are selected based on a playing history of a user;

a user selection unit configured to refer to the content information database and select by the client device, for each item of content selected by the content selection unit, a single user who is executing the selected item of content, wherein the single user that is selected who is executing the content has an experience level in controlling the content greater than a predetermined threshold; and a publication unit configured to publicize, over a network, to a plurality of client devices currently not executing the content selected by the content selection unit moving images showing a screen in which the item of content currently executed by the single user selected by the user selection unit is being executed, cyclically switching between the predetermined number of items of content, wherein, for each of the plurality of client devices not currently executing the content, the cyclically switching is not stopped until a user selects an item of content to start execution of the selected item of content, wherein the user selection unit selects a particular user who has executed the item of content for a longest duration, for each of a second predetermined number of items of content selected by the content selection unit.

11. The execution screen publication device according to claim 1, wherein the content selection unit selects the predetermined number of items by comparing an age of a user to ages of the users currently not executing each item of content and selecting users currently not executing each item of content that are within a predetermined age range of the user.

* * * * *